Figure 9:
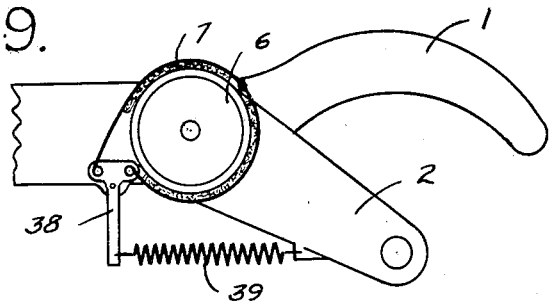

Feb. 14, 1933. S. C. SMITH 1,897,443
SHOCK ABSORBER
Filed July 25, 1927 3 Sheets-Sheet 1
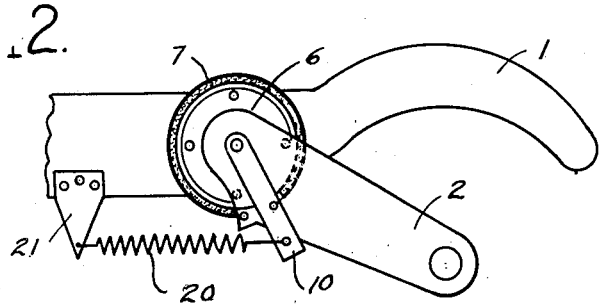
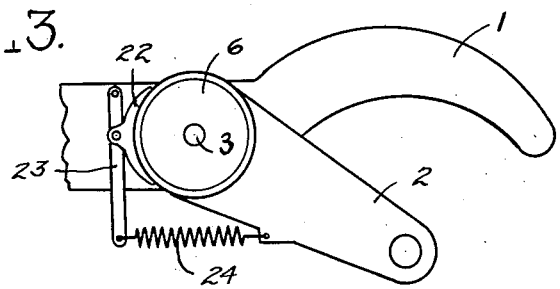
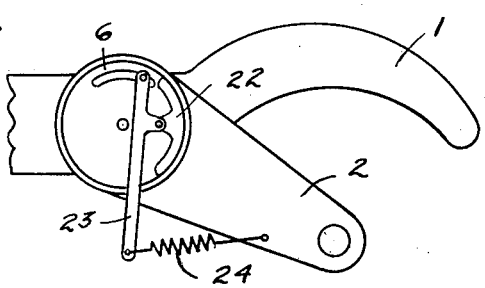
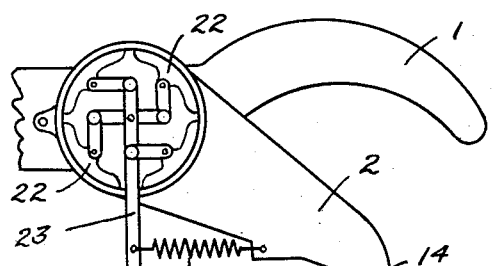
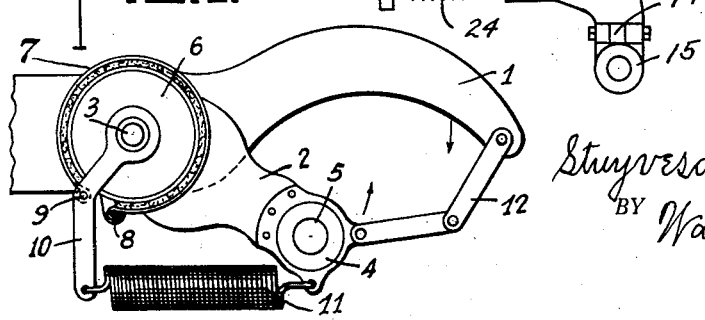
INVENTOR.
Stuyvesant C. Smith
BY Walter N. Haskell,
his ATTORNEY.

Feb. 14, 1933. S. C. SMITH 1,897,443
SHOCK ABSORBER
Filed July 25, 1927 3 Sheets-Sheet 2
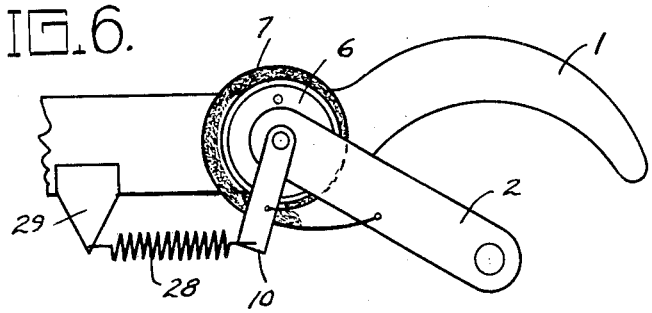
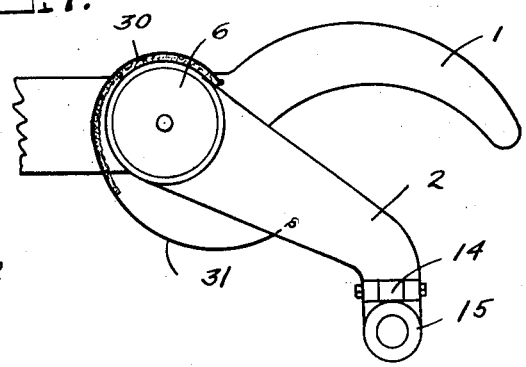
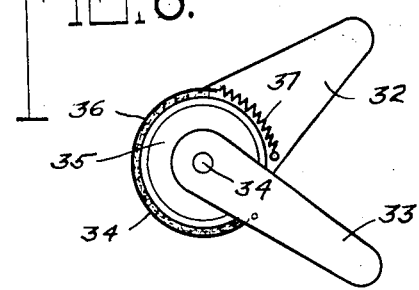
INVENTOR.
Stuyvesant C. Smith,
BY Walter N. Haskell,
his ATTORNEY.

Feb. 14, 1933. S. C. SMITH 1,897,443
SHOCK ABSORBER
Filed July 25, 1927 3 Sheets-Sheet 3

Stuyvesant C. Smith INVENTOR.
BY Walter N. Haskell,
his ATTORNEY.

Patented Feb. 14, 1933

1,897,443

UNITED STATES PATENT OFFICE

STUYVESANT C. SMITH, OF CHICAGO, ILLINOIS

SHOCK ABSORBER

Application filed July 25, 1927. Serial No. 208,176.

My invention has reference to a shock destroyer for vehicles, and it is more specially designed for vehicles having a relatively heavy rebound, such as motor vehicles. It can readily be adapted to conveyances of a lighter build, however, including baby carriages, and can also be applied to doors, as a check therefor, and to other mechanical contrivances including landing gears of aeroplanes.

The chief purpose of the invention is to provide a mechanical means for exhausting the energy imparted to the relatively movable parts of a vehicle, by means of friction, in such a manner as to produce absolutely perfect results. By its use the ordinary leaf springs of a vehicle may be eliminated, together with the connecting shackles therefor, and attendant inconveniences.

The device set out herein is so constructed and arranged that the shock will be destroyed partly on the bound and partly on the rebound, in any proportion with relation to both, as may be desired. The friction devices are coupled up with tension elements, such as coiled springs, in such a manner that a unitary part is formed thereby, the proportionate work of which may be divided in any desired manner. For example, the shock can be destroyed or the energy produced thereby exhausted ninety per cent by friction on the bound, and the remaining ten per cent of friction on the rebound. This proportion can be varied as desired, however. In the operation of the device there is always increasing frictional contact of the brake members on approach of the relatively movable parts of the vehicle or machine towards each other.

The return of the parts of the invention to normal is instantaneous, on account of the relatively small amount of friction offered to the rebound. When a shock is received by the device the compression period is much longer than the reaction therefrom. It is also true that at the start of the compression the friction is much less than it is at the end of the movement, so that the action of the device is quicker at the start and is then gradually reduced in proportion to the increase of the friction. By way of comparison, when the brakes are applied to reduce the speed of a vehicle there is a minus acceleration. In the same way in absorbing a shock there is a minus or negative acceleration. In returning to normal there is no variation in the rate of return.

In case the shock absorber is relieved of the weight of the vehicle, as when the wheels encounter a depression in the road, the device will throw the wheels instantaneously into the depression, as there is no friction to interfere, and the vehicle will then be permitted to come down gradually to its normal position with relation to the wheels. With this invention the only factor governing the degree of riding comfort is the distance or limits through which the absorber is allowed to flex. Within the same limitations in which a leaf spring of conventional type would be nine per cent efficient the present invention would have an efficiency of ninety percent.

In the operation of the device the spring is governor of the brake, and the spring energy determines the amount of brake pressure. When a ratio between the two is once established it is maintained. Its operation is governed by certain laws. That relating to coiled springs is that the force or pull of the spring is in direct proportion to the distance it is elongated, and the energy is destroyed by the friction in direct proportion to the pressure exerted to produce the friction. A combination of these laws would result in the statement that the energy destroyed by the brake is in direct proportion to the energy stored in the spring, and the energy stored in the spring is directly proportionate to the distance through which the force acts on the spring. Therefore the energy destroyed is in direct proportion to the amount of motion or distance moved, which is in turn directly proportional to the force of the shock received.

The particular construction, arrangement, and operation of the invention will more fully appear from the following specification, taken in connection with the accompanying drawings, in which:

Fig. 1 shows the invention in side elevation, in its preferred embodiment.

Figs. 2 to 12 inclusive are sketch illustrations of modified forms of the invention, involving the same principle set out in Fig. 1, which modifications will be more particularly referred to hereinafter.

Referring to Fig. 1 of the drawings, the reference number 1 indicates a relatively stationary part, such as the frame of a motor vehicle, with which is connected an arm 2, as by a pivot 3, permitting movement of the parts 1 and 2 to or from each other. The arm 2 is shown provided at its free end with a bearing 4, for connection with the axle upon which the frame 1 is supported, as at 5. Mounted on the pivot 3 is a drum 6, which drum is rigidly attached to the arm 2, and encircling said drum is a brake-band 7, one end of which is connected with a post 8 on the frame 1, and the other end of which is attached to a post 9 on a lever 10 loosely supported on the pivot 3. The free end of the lever 10 is connected by a coiled spring 11 with the end of the arm 2, which operates to hold the brake-band in engagement with the drum 6, with such initial frictional force as may be desired. The ends of the frame 1 and arm 2 are shown as being connected by a folding brace 12, which tends to maintain the true positions of said parts with relation to each other, but this brace is not essential to the prescribed operation of the invention, and its use is optional.

In the operation of the invention, in the event of the parts 1 and 2 approaching each other, as indicated by the arrows, the spring 11 is expanded, exerting a yieldable force on the end of the lever 10, causing the brake-band to contract, and increasing the friction thereof upon the drum 6 in proportion to the compressive movement of the parts 1 and 2. The brake-band is preferably provided with a lining of fiber or other suitable material, which will have the desired frictional action. The parts 1 and 2 have been referred to as approaching each other, but as a matter of fact the movement would probably be chiefly in one of said parts, moving in the direction of the other part and back again. It would appear that in the movement of a vehicle over inequalities in the ground the frame 1 would move up and down upon the wheels passing over such inequalities, but as a matter of fact the axle responds to the road shock, and the arm 2 conforms to the movement thereof.

When the brake and spring are properly connected in any desired ratio the shock is partly destroyed by the friction of the brake-band and partly absorbed by the spring on the bound, and on the rebound the potential energy stored in the spring in the first instance is fully exhausted by the brake upon its returning to its normal position. The acme of perfection is reached when the movable part comes to a state of rest at the end of the first rebound.

Many changes can be made in the relative action of the brake and spring. For example, the bound can be taken care of chiefly by the brake, and the rebound by the spring, or this may be reversed, the force of the spring being made use of on the bound, and the action of the brake on the rebound. Many variations can be made in the construction and arrangement of the invention to meet different requirements thereof, some of such changes being pointed out in some of the figures of the drawings submitted herewith.

The greater the compressive force or energy imparted to the movable parts of the invention the greater is the force applied to the destruction thereof, and the same is true of the expansion of such parts. It is also to be noted that the amount of pressure exerted by the brake band is dependent upon the energy of the spring connected therewith, and that the action of the brake and spring is always correlated. They are never separated, and never act independently of each other.

In Fig. 2 the position of the lever 10 is changed and the end thereof connected by a spring 20 with a lug 21 on the frame 1. The position of the brake-band is also reversed.

Fig. 3 shows an embodiment of the invention wherein the brake-band is replaced by a brake-shoe 22, carried by a lever 23, pivoted to the frame 1 and connected by a spring 24 with the arm 2. Fig. 4 shows an internal arrangement of the same idea, and Fig. 5 illustrates a compound form of the arrangement shown in Fig. 4. The action of the brake-shoe is different from that of the brake-band, the pressure being the same throughout the face of the shoe, whereas in the brake band the force exerted is much greater at one end than at the other.

In Fig. 6 is shown a construction wherein the ends of the brake-band over-lap, and are fastened respectively to the arm 2 and lever 10, which lever is also connected by a contractile coiled spring 28 with a fixture 29 on the arm 1.

In Fig. 7 is shown a reversal of this form, wherein the end of the brake-band is fastened to the frame 1 and the end of the extension to the arm 2. In the first instance the drum is shown fixed to the frame, and in the second instance to the arm 2.

Fig. 8 is a simple exposition of the idea, more specially fitted for use with screen doors and other closures, to prevent a too abrupt shutting thereof. It consist of a pair of arms 32 and 33, having a common pivot 34, upon which is also mounted a drum 35, provided with a brake band 36, attached at one end to the arm 33 and at the other end to a coiled spring 37, fixed to the arm 32.

One of said arms is secured to a fixture, such as the frame of a door, and the other arm to the door itself.

In Fig. 9 is shown another variation in which the brake-band 7 is connected at its ends to the head of a T-lever 38, the end of which has a connection through a coiled spring 39 with the arm 2. The lever 38 is pivoted on the frame 1, as at b. The rocking of the lever serves to tighten the brake-band, which is in two sections, attached to the arm 1 at a central point.

Figure 10:
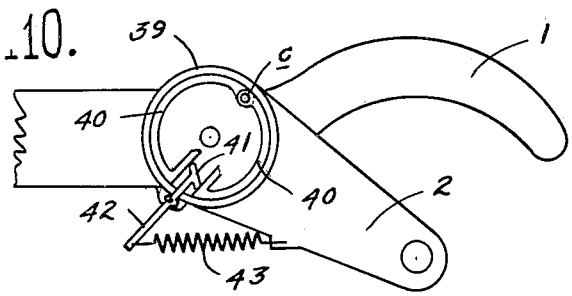

In Fig. 10 is a somewhat similar arrangement of the brake-shoe apparatus, in which 39 indicates the drum, attached to the arm 2, and fitted with internal semicircular shoes 40, pivoted at c. Said shoes are provided with parallel end portions, between which is the cam head 41 of a lever 42, connected with the arm 2 by a coiled spring 43. A movement of the part 2 will actuate the lever 42, forcing the shoes 40 outwardly.

Figure 11:
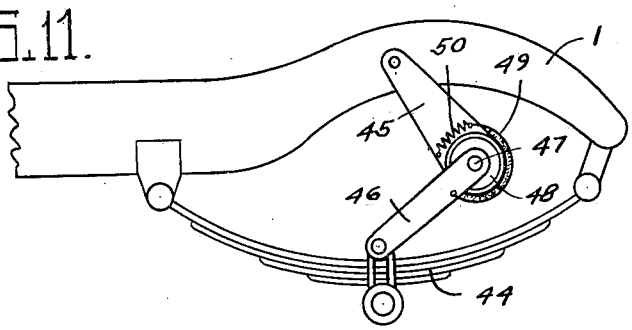
Figure 12:
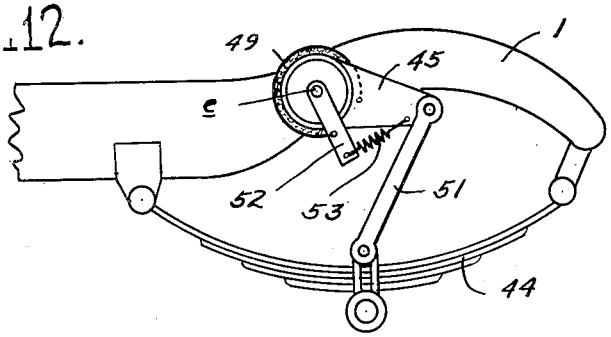

Figures 11 and 12 show an application of the invention to the conventional type of leaf spring. In the first-named a leaf spring 44 is shown attached to the frame 1, said parts being united by arms 45 and 46, having a common pivot pin 47. A drum 48 is mounted between said arms and provided with a band 49, one end of which is attached to the arm 46 and the other end with a coiled spring 50 fixed to the arm 45. The compression of the spring 44 carries the arm 46 upwardly, with the friction effect on the drum which has been hereinbefore pointed out. Fig. 12 is somewhat similar, except that the arm 45 has a pivotal connection with the arm 1 as at e, said arm being connected with the spring 44 by a link 51, pivotally connected at each of its ends. A lever 52 is also provided, to which one end of the brake-band is attached, the end of said lever being connected by a spring 53 with the outer end of the arm 45.

In case of the drum being fixed to the frame it is preferably positioned between the frame and arm 2, but if attached to said arm 2 it is preferably fixed to the outer face thereof, the arm being between the drum and frame. In all cases the connections between the frame or arm must be in line with the drum, which is also true of the lever 10, and greater efficiency can be secured by having a double lever and double arm, on opposite sides of the drum.

Other adaptations and applications of the invention can doubtless be made, but those which have most readily suggested themselves to applicant have been set forth herein.

As before mentioned, the invention is not limited to the uses pointed out herein, but it can be applied to door closures, other types and sizes of vehicles, and mechanisms of various kinds where two parts have a movable relation with each other.

What I claim and desire to secure by Letters Patent, is:

A shock absorber, comprising relatively stationary and movable parts, a drum rotatably mounted and fastened to the movable part so as to rotate upon the movement of said movable part, a brake-band engaging said drum and attached at one of its ends to the relatively stationary part, and a lever connecting the other end of said brake-band with a spring connected with said movable part.

In testimony whereof I affix my signature.

STUYVESANT C. SMITH.